United States Patent [19]

Saito et al.

[11] 4,330,589
[45] May 18, 1982

[54] FOAMED GYPSUM MOULDED ARTICLES AND PRODUCTION THEREOF

[75] Inventors: Masumi Saito, Kobe; Eiichi Hirai, Takarazuka; Masao Endo, Nishinomiya; Toru Nishino, Hirakata, all of Japan

[73] Assignee: Kurashiki Boseki Kabushiki Kaisha, Kurashiki, Japan

[21] Appl. No.: 262,916

[22] Filed: May 12, 1981

[30] Foreign Application Priority Data

May 15, 1980 [JP] Japan .................................. 55/65060

[51] Int. Cl.³ .......................... B32B 3/00; B32B 5/20; B32B 13/00; B32B 13/04
[52] U.S. Cl. .................................. 428/312.4; 106/87; 264/42; 428/703; 428/314.4
[58] Field of Search ...................... 428/310, 314, 703; 106/87; 264/42

[56] References Cited

U.S. PATENT DOCUMENTS

| | | | |
|---|---|---|---|
| 1,946,077 | 2/1934 | Kauffmann | 106/87 |
| 2,024,791 | 12/1935 | Adolph et al. | 106/87 |
| 2,371,928 | 3/1945 | Schneider | 106/87 |
| 3,989,534 | 11/1976 | Glunguian et al. | 106/87 |
| 4,040,850 | 8/1977 | Kyri et al. | 106/87 |
| 4,043,825 | 8/1977 | Müller et al. | 106/87 |
| 4,104,077 | 8/1978 | Kobayashi et al. | 106/87 |
| 4,171,985 | 10/1979 | Motoki et al. | 106/87 |

Primary Examiner—William J. Van Balen
Attorney, Agent, or Firm—Berman, Aisenberg & Platt

[57] ABSTRACT

Present invention provides foamed gypsum moulded articles excellent in sound absorbing property and production thereof. The foamed gypsum moulded article has many foam-cells, and the foam-cells are interconnected through fine passages. The fine passages are formed using as a decomposition catalyst of hydrogen peroxide for expansion a cobalt compound produced by pretreating a water soluble cobalt salt with hydrogen peroxide in the presence of alkali. The foamed gypsum moulded article is preferably applicable to an interial wall, ceiling panel, and the like.

11 Claims, 2 Drawing Figures

FOAMED GYPSUM MOULDED ARTICLES AND PRODUCTION THEREOF

DETAILED DESCRIPTION OF INVENTION

The present invention relates to foamed gypsum moulded articles, such as board, panel, block and the like, which are excellent in sound absorbing quality and the production thereof.

In general, a foamed gypsum moulded article as produced by foaming a gypsum slurry with hydrogen peroxide and then hardening it is poor in the sound absorbing quality, because the foaming cells are isolated non-interconnected cells. Improvement of the sound absorbing quality in the foamed gypsum moulded article particularly for interior, wallboard, ceiling panel and the like, is strongly required.

It has been found that the sound absorbing quality is improved by interconnecting the isolated cells through passages. Thus the present invention provides a foamed gypsum moulded article comprising a plurality of isolated cells, the cell walls of which have fine, intercell connecting passages, and the process for production thereof.

An average diameter of the isolated cells existing in the sliced surface of a foamed gypsum moulded article of the present invention is from about 0.15 to 4 mm preferably 0.3 to 3 mm.

The diameter of smaller than 0.15 mm results in a less absorbing quality, and the diameter of larger than 4 mm brings an insufficient rigidity as well as a less absorbing quality.

In addition, the isolated cells of the foamed gypsum moulded article of the present invention have intercell connecting passages in the cell walls.

The average diameter of the passages is about typically from 0.05 to 1 mm, preferably 0.1 to 0.8, provided that the average diameter does not exceed half the diameter of the cell. When the diameter of the passages is smaller than 0.05 mm, a sufficient sound absorbing property cannot be obtained, and being larger than 1 mm, both of the sound absorbing property and the strength become insufficient.

The specific gravity of the foamed part of the gypsum moulded article is preferably about 0.4 to 0.7, and the expansion ratio is from about 1.4 to 3.5 in the use as wallboard, but not critical.

In order to give an excellent sound absorbing property to the foamed gypsum moulded article, it is preferable that the intercell connecting passages are formed in the wall of at least 80 percent of the isolated cell.

The foamed gypsum moulded article of the present invention includes a composite reinforced with a back sheet, which is improved in the strength, and easily mounted to wall, ceiling and the like by applying adhesive agent on the back sheet.

One embodiment of the moulded article according to the present invention is schematically represented by FIG. 1, and a grossly enlarged partially sectional view is schematically represented by FIG. 2. In the Figures, (1) is a foamed gypsum layer of the moulded article, (2) is an isolated cell, (3) is an intercell connecting passage and (4) is a back sheet.

Further, the present invention provides the process for production of the aforementioned foamed gypsum moulded article, wherein the moulded article is produced by foaming a gypsum slurry containing a foam stabilizer by decomposition of hydrogen peroxide using a cobalt compound prepared by oxidation of a water soluble cobalt salt: said oxidation is effected by pretreating the cobalt salt with hydrogen peroxide in the presence of an alkali.

A feature of the present invention is in two step uses of hydrogen peroxide: the first step is a pretreatment of the cobalt salt and the second step is an expansion process of the gypsum slurry.

The expansion of the gypsum slurry is promoted by the pretreatment of the cobalt salt (i.e. the oxidation by the hydrogen peroxide) and then the expansion rate becomes faster.

The promotion of the expansion effects to pierce the cell-walls to form the fine, intercell connecting passages in the walls. The direct use of the cobalt salt without the pretreatment gives only insufficient numbers of passage.

The pretreatment of the cobalt salt by hydrogen peroxide may be effected by contacting the cobalt salt with hydrogen peroxide in the presence of alkali. The pretreatment may be achieved in the presence of a partial or whole of other components such as gypsum, foam stabilizer, other additives such as reinforcement, and the like intended to be used for gypsum moulded article production, if necessary.

The above two steps may be carried out in varied embodiments according to the nature of the components to be used, intended properties of the moulded article and the like. Following embodiments are exemplified:

(1) Mixture of a cobalt salt powder, an alkali powder and a gypsum powder may be added to hydrogen peroxide solution for pretreatment and then added to mixture of a foam stabilizer and hydrogen peroxide for expansion.

(2) Mixture of aqueous solutions of a cobalt salt, an alkali and hydrogen peroxide for pretreatment (referred to (A)), and hydrogen peroxide for expansion solution (referred to (B)) are severally prepared, wherein a foam stabilizer may be added to either of them.

Gypsum may be added to the mixture of (A) and (B), or premixed with (A) or (B) and then added to (B) or (A) respectively.

(3) Mixture of a cobalt salt powder and a gypsum powder and mixture of an alkali solution and hydrogen peroxide for pretreatment are mixed, and then mixture of a foam stabilizer and hydrogen peroxide for expansion is added to the resultant mixture.

(4) Mixture of an alkali and a gypsum powder and an aqueous solution of a cobalt salt and hydrogen peroxide for pretreatment is mixed, and then the mixture of foam stabilizer with hydrogen peroxide for expansion is added.

Every embodiment is preferable and gives no essential differences to the products in physical properties, particularly sound absorbing property.

In the pretreatment of the water soluble cobalt salt, amount of the hydrogen peroxide is at least about 3 parts by weight, preferably about 12 parts by weight based on 100 parts by weight of the water soluble cobalt salt (in the term of metal cobalt). The hydrogen peroxide may be used in a high concentration (for example 35 to 60 percent), or in a dilution.

The pH value of the pretreatment mixture is controlled using alkali such as potassium hydroxide, sodium hydroxide, calcium hydroxide, calcium oxide, ammonia water and the like, at least about 8.2, preferably more than about 9.3. In such a condition oxidation of the water soluble cobalt salt completes immediately at an ambient temperature.

The hydrogen peroxide may used in large excess for the oxidation of the water soluble cobalt salt. As the amount of the hydrogen peroxide consumed for the oxidation is negligible, the most part of the hydrogen peroxide used in the pretreatment may be remained in the pretreatment mixture as a hydrogen peroxide or oxygen bubbles, and some parts of the oxygen run away from the mixture. The hydrogen peroxide and the oxygen bubbles remaining in the pretreatment mixture also effect to expansion of the gypsum slurry. Therefore, the expantion ratio of the foamed gypsum moulded article is dominated by the amount of the hydrogen peroxide for expansion, and the oxygen bubbles and the hydrogen peroxide remaining in the pretreatment mixture. Whole amount of the hydrogen peroxide to be used in both the pretreatment and the expansion may be decided experimentally according to the intended expansion ratio of the gypsum moulded article. The whole amount of the hydrogen peroxide is conducive to expansion about 0.14 to 0.7 (as active principle) part by weight to 100 parts by weight of gypsum in order to obtain a moulded article having a specific gravity of about 0.5, though depended on procedure.

In the meanwhile, ratio of the passages is mainly depended on the amount of the hydrogen peroxide for expansion. In order to make the passages in at least 80 percent of isolated cells, the amount of the hydrogen peroxide for expansion (the amount of the hydrogen peroxide used in the expansion process, but not the amount of hydrogen peroxide actually effective to the expansion) is at least about 0.12 part by weight (as active principle) to 100 parts by weight of gypsum.

The concentration of the hydrogen peroxide for expansion may be controlled in the manner that water content of the gypsum slurry becomes about 30 to 100 parts by weight of the gypsum.

pH value of the gypsum slurry in the expansion process is preferably at least 8.2, most preferably more than 9.3 and the temperature at mixing is usually from 15° to 45° C.

The gypsum slurry obtained by mixing every component is casted into a desirable mould and cured. The resultant foamed gypsum moulded article has a plurality of isolated cells of an average diameter of about 0.15 to 4 mm, the cell-walls of which have fine, intercell connecting passages of about 0.05 to 1 mm diameter; the passages are distinguished from capillary having a diameter of 10 to 100 $\mu$m, which is produced by the evaporation of water in the gypsum slurry.

The percentage of the pasages to the isolated cell is calculated by the number of the passages on a magnified photograph of a surface of the foamed article.

The foamed gypsum moulded article may be produced by casting the gypsum slurry on a sheet such as back sheet or face sheet laid over the bottom of the mould, and curing it with foaming. The resultant board is reinforced by the sheet, and the application of the moulded article such as board to wall becomes easier.

As the surface of the foamed gypsum moulded article produced by the above process is usually covered with gypsum thin layer, when using the article, the layer may be scraped off by sanding or cutting to expose a porous surface. In order to expose the surface of the moulded article, immediately after casting, a sheet such as paper may be laid over the moulded article surface and stripped from the moulded article before ending of the coagulation in appearance.

The gypsum of the present invention includes a gypsum produced in exhaust gas treatment, $\alpha$- or $\beta$-hemihydrate gypsum, natural gypsum and other chemical gypsum not critically. The gypsum produced in the exhaust gas treatment is desirable in the aspect of antipolution and reutilization of resources.

The alkali according to the present invention includes calcium oxide, calcium hydroxide, potassium hydroxide, ammonia water and the like. Amount of the alkali to be used on pH value of the gypsum slurry, that is, the pH value of the gypsum slurry before addition of the hydrogen peroxide for pretreatment of the water soluble cobalt salt. Thus, the amount of the alkali preferably controlled at least about pH 8.2 most preferably more than about 9.3.

As the water soluble cobalt salt of the present invention, cobalt sulfate, cobalt chloride, cobalt acetate are exemplified, but not critical. The cobalt salt is preferably used in about 0.002 to 0.2 part by weight in the term of metal cobalt based on 100 parts by weight of gypsum in general. It is preferable to control the amount so that the expansion of the gypsum slurry may terminate within about 200 seconds.

As the foam stabilizer, following materials are exemplified: polyvinyl acetate; acrylic polymers such as poly(methyl acrylate), poly(ethyl acrylate), poly(methyl methacrylate), poly(ethyl methacrylate), copolymer of acrylic or methacrylic acid ester and other monomer having ethylenically unsaturated bond, such as styrene, ethylene, vinyl acetate, and acrylonitrile, partial saponified polymer thereof; ethylene-vinyl acetate copolymer; polyvinyl chloride; acrylonitrile-butadiene copolymer; styrene-butadiene copolymer; polyamide-epichlorohydrin copolymer and the like.

An emulsion type foam stabilizer is more preferable, but a solution type may be applied. Most preferable foam stabilizer is a polyvinyl acetate emulsion or an acrylic polymers emulsion.

When the foam stabilizer is used in excess, passage can not be made, and when used in deficiency, the expansion can not be effectively achieved. Preferable amount of the foam stabilizer is about 0.1 to 20 parts by weight as solid to 100 parts by weight of the gypsum.

The foamed gypsum moulded article of the present invention may include pigments, resinous materials and reinforcements such as glass fiber, rock wool, asbestos, synthetic fiber and the like. The amount of the reinforcement should be within less than 6 parts by weight to 100 parts of the gypsum, in the aspect of the sound absorbing property.

The foamed gypsum moulded article has a plurality of isolated cells interconnected by fine passages, so that it can absorb sound, and then it is particularly preferably applicable as an interior pannel excellent in sound absorbing property.

EXAMPLE 1

According to the formulation as given in Table 1, hydrogen peroxide for pretreatment is added to aqueous solution containing the cobalt sulfate and the potassium hydroxide and then the gypsum powder is added with stirring to give a gypsum slurry. Mixture of the hydrogen peroxide for expansion and the acrylic emulsion is added to the slurry. At some time during or immediately after the expansion, the resultant slurry is casted into mould (13.6 cm×16 cm×4 cm), on the bottom of which a back sheet is laid, and then held for 15 minutes. The resultant is removed from the mould, aged for about one hour, and then dried at 45° C. for 6 hours.

The surface of the resultant foamed gypsum board is scraped by sanding to expose the porous surface to give a foamed gypsum board having a thickness of 19 mm (referred to Board I hereinafter).

The sound absorbing property of the Board I is measured according to JIS (Japanese Industrial Standards) A1405 (Measurement of Absorption Ratio of Sound Vertically Incidented). The result (sound absorption percentage) is given in Table 2.

EXAMPLE 2

Board II having a thickness of 19 mm is obtained by following Example 1 except for using cobalt acetate instead of cobalt sulfate.

The sound absorbing property of Board II is measured in the same manner as described in Example I. The result is shown in Table 2.

EXAMPLE 3

According to the formulation as shown in Table 1, the hydrogen peroxide for pretreatment solution is added to an aqueous solution of the potassium hydroxide and then to the mixed solution, mixture of the gypsum powder and the cobalt sulfate powder is added with stirring to give a gypsum slurry. Mixture of the hydrogen peroxide for expansion and the acrylic emulsion (foam stabilizer) is added to the slurry. At some time during or immediately after the expansion, the resultant slurry is cast into a mould (13.6 cm × 16 cm × 4 cm), on the bottom of which a back sheet is laid, and then held for 15 minutes. The resultant is removed from the mould, aged for about one hour, and then dried at 45° C. for 6 hours.

The surface of the resultant foamed gypsum board is scraped by sanding to expose the porous surface to give a foamed gypsum board having a thickness of 19 mm (referred to Board III hereinafter).

The sound absorbing property of Board III is measured according to the same manner as described in Example 1. The result is shown in Table 2.

EXAMPLE 4

According to the formulation as given in Table 1, powder mixture of the gypsum, cobalt sulfate and calcium hydroxide is added to an aqueous solution of the hydrogen peroxide for pretreatment with stirring to give a gypsum slurry. The gypsum slurry is foamed and moulded in the same manner as described in Example 1 to give Board IV (19 mm thickness). The sound absorbing property of the Board IV is measured in the same manner as described in Example 1. The result is shown in Table 2.

EXAMPLE 5

According to the formulation of Table 1, the gypsum powder is added to the mixture of water, cobalt sulfate, potassium hydroxide, hydrogen peroxide for pretreatment, and acrylic emulsion (foam stabilizer) with stirring to give a gypsum slurry. The hydrogen peroxide for expansion is added to the gypsum slurry. At some time during or immediately after the expansion, the resultant slurry is casted into a mould (13.6 cm × 16 cm × 4 cm), on the bottom of which a back sheet is laid and then held for 15 minutes. The resultant is removed from the mould, aged for about one hour, and then dried at 45° C. for 6 hours. The surface of the resultant foamed gypsum board is scraped by sanding to expose the porous surface to give Board V (19 mm thickness). The sound property of the Board V is measured in the same manner as described in Example 1. The result is shown in Table 2.

COMPARATIVE EXAMPLE 1

According to the formulation of Table 1, powder mixture of the gypsum, cobalt sulfate, and calcium hydroxide is added to an aqueous mixture of the hydrogen peroxide and the acrylic emulsion to give a gypsum slurry. At some time during or immediately after the expansion, the resultant slurry is cast into mould (13.6 cm × 16 cm × 4 cm), on the bottom of which a back sheet is laid, and then held for 15 minutes. The resultant is removed from the mould, aged for about one hour, and then dried at 45° C. for 6 hours.

The surface of the resultant foamed gypsum board is scraped by sanding to expose the foamed gypsum surface to give Board VI (19 mm thickness).

The sound absorbing property of the Board VI is measured in the same manner as described in Example 1. The result is shown in Table 2.

COMPARATIVE EXAMPLE 2

According to the formulation of Table 1, first of all, the gypsum powder is added to the cobalt sulfate and the potassium hydroxide, and then mixture of the hydrogen peroxide and the acrylic emulsion is added with stirring to give a gypsum slurry. At some time during or immediately after the expansion, the resultant slurry is cast into a mould (13.6 cm × 16 cm × 4 cm), on the bottom of which a back sheet is laid, and then held for 15 minutes. The resultant is removed from the mould, aged for about one hour, and then dried at 45° C. for 6 hours.

The surface of the resultant board is scraped by sanding to expose the porous surface to give Board VII (19 mm thickness).

The sound property of the Board VII is measured in the same manner as described in Example 1. The result is shown in Table 2.

TABLE 1

| formed gypsum board (specific gravity: g/cm$^3$) Ingredient | Examples | | | | | Comparative Examples | |
|---|---|---|---|---|---|---|---|
| | 1 (0.52) | 2 (0.51) | 3 (0.53) | 4 (0.55) | 5 (0.56) | 1 (0.51) | 2 (0.53) |
| gypsum[1] | 100 | 100 | 100 | 100 | 100 | 100 | 100 |
| potassium hydroxide (5%) | 2 | 2 | 2 | | 2 | | 2 |
| calcium hydroxide | | | | 0.2 | | 0.2 | |
| cobalt sulfate (CoSO$_4$ . 7H$_2$O) | 0.1 | | 0.1 | 0.1 | 0.1 | 0.1 | 0.1 |
| cobalt acetate (Co(CH$_3$COO)$_2$ . 4H$_2$O) | | 0.09 | | | | | |
| hydrogen peroxide (6%: for pretreatment) | 0.5 | 0.5 | 0.5 | 0.5 | 0.5 | | |
| hydrogen peroxide | | | | | | | |

TABLE 1-continued

| formed gypsum board (specific gravity: g/cm³) | Examples | | | | | Comparative Examples | |
|---|---|---|---|---|---|---|---|
| Ingredient | 1 (0.52) | 2 (0.51) | 3 (0.53) | 4 (0.55) | 5 (0.56) | 1 (0.51) | 2 (0.53) |
| (6%: for expansion) | 5.5 | 5.5 | 5.5 | 5.5 | 5.5 | 6 | 5.5 |
| foam stabilizer[2] | 2 | 2 | 0.3 | 0.3 | 0.5 | 0.5 | 2 |
| water | 57 | 59 | 59.7 | 59.7 | 59 | 59.5 | 57 |

[1]produced from the process for treatment of exhausted gas
[2]Primal M-30 available from Nippon Acryle Kagaku K.K.: Polyacrylic ester emulsion having a pH value of 8.6 to 10.1 (contents 45 percent by weight).

TABLE 2

| | foamed gypsum Board | | | | | | |
|---|---|---|---|---|---|---|---|
| | Example | | | | | Comparative Example | |
| Frequency (Hz) | 1 | 2 | 3 | 4 | 5 | 1 | 2 |
| 250 | 11 | 9 | 8 | 11 | 6 | 4 | 4 |
| 400 | 21 | 16 | 16 | 17 | 12 | 6 | 5 |
| 630 | 38 | 29 | 31 | 25 | 27 | 9 | 6 |
| 1000 | 50 | 45 | 53 | 35 | 53 | 15 | 10 |
| 1600 | 57 | 61 | 60 | 47 | 68 | 26 | 17 |
| 2000 | 56 | 65 | 59 | 50 | 67 | 28 | 22 |

EXAMPLES 6 TO 8

According to the formulation as given in Table 3, foamed gypsum board test pieces (19 mm thickness) are prepared in the same manner as described in Example 5. The sound absorbing properties of the boards are measured in accordance with JIS A1405. The results are shown in Table 3.

EXAMPLE 9

According to the formulation as given in Table 3, the hydrogen peroxide for the pretreatment is added to an aqueous solution containing the cobalt sulfate and the potassium hydroxide to give a premixture. In the meanwhile, the gypsum powder is added to mixture of the hydrogen peroxide for expansion and the foam stabilizer with stirring to give a gypsum slurry. The premixture is added to the gypsum slurry and then casted into a mould (13.6 cm×16 cm×4 cm). A test piece is prepared and its sound absorbing property is measured according to Example 1. The result is shown in Table 3.

EXAMPLES 10 TO 13

According to the formulation as given in Table 3, foamed gypsum board test pieces (19 mm thickness) are prepared in the same manner as described in Example 1. The sound absorbing properties of the test piece are measured according to JIS A1405. The results are shown in Table 3.

TABLE 3

| | Example | | | | | | | |
|---|---|---|---|---|---|---|---|---|
| ingredients | 6 | 7 | 8 | 9 | 10 | 11 | 12 | 13 |
| gypsum[1] | 100 | 100 | 100 | 100 | 100 | 100 | 100 | 100 |
| potassium hydroxide (5%) | 3 | 3 | 3 | 2 | 3 | 3 | 3 | 3 |
| cobalt sulfate | 0.08 | 0.08 | 0.1 | 0.1 | 0.06 | 0.08 | 0.1 | 0.08 |
| hydrogen peroxide (6%) (for pretreatment) | 0.5 | 0.5 | 0.3 | 0.5 | 0.5 | 0.5 | 0.5 | 0.5 |
| hydrogen peroxide (6%) (for expansion) | 3.5 | 5.0 | 7.0 | 5.5 | 5.5 | 6.5 | 6.5 | 5 |
| foam stabilizer (note) | 10[3] | 5[4] | 7[5] | 2[6] | 7[7] | 0.5[8] | 0.3[9] | 5[10] |
| water | 59 | 63.5 | 61.5 | 68.5 | 65.5 | 68.5 | 64 | 66.5 |
| specific gravity | 0.62 | 0.52 | 0.41 | 0.56 | 0.48 | 0.45 | 0.44 | 0.50 |
| sound absorbing property (Hz) | | | | | | | | |
| 250 | 13 | 11 | 7 | 13 | 14 | 14 | 7 | 13 |
| 400 | 21 | 18 | 17 | 23 | 24 | 22 | 17 | 20 |
| 630 | 30 | 30 | 38 | 34 | 36 | 30 | 23 | 28 |
| 1000 | 41 | 46 | 57 | 47 | 48 | 38 | 32 | 39 |
| 1600 | 52 | 59 | 72 | 62 | 58 | 46 | 43 | 52 |

TABLE 3-continued

| ingredients | Example | | | | | | | |
|---|---|---|---|---|---|---|---|---|
| | 6 | 7 | 8 | 9 | 10 | 11 | 12 | 13 |
| 2000 | 58 | 58 | 67 | 63 | 59 | 52 | 49 | 54 | note:
[1] Produced from the process for treatment of exhausted gas
[3] Polysol PS-10 available from Showa Highpolymer Co., Ltd.: Polyvinyl acetate emulsion having a viscosity of 2000 cps (at 30° C., 10 rpm), pH value of 3 to 4, MFT (minimum film forming temperature) of 2° C., and a content of 50 percent (nonionic).
[4] Polysol EVA P-4 available from Showa Highpolymer Co., Ltd.: Ethylene-vinyl acetate copolymer emulsion having a viscosity of 3500 cps (at 30° C., 10 rpm), pH value of 4 to 5, MFT of 0° C., and a content of 50 percent (nonionic).
[5] Nippol LX206 available from Nippon Geon K.K.: Styrene-butadiene copolymer emulsion having a viscosity of 20 cps (at 25° C., 12 rpm), and a content of 45.5 percent (nonionic).
[6] Nikasol CL-204 available from Nippon Carbide Industries Co., Ltd.: Vinyl acetate-acrylic copolymer emulsion having a viscosity of 300 to 600 (at 25° C., 20 rpm), pH value of 4 to 5, MFT of 8° C., and a content of 55 percent.
[7] Polysol AP2662 available from Showa Highpolymer Co., Ltd.: Styrene-acrylic copolymer emulsion having a viscosity of 7500 cps (at 30° C., 10 rpm), pH value of 8 to 9, MFT of 25 to 27° C., and a content of 50 percent (anionic).
[8] Geon 576 available from Nippon Geon K.K.: Polyvinyl chloride emulsion having pH value of 9, MFT of 25° C., and content of 55 percent.
[9] Nippol 1571 available from Nippon Geon K.K.: Acrylonitrile-butadiene copolymer emulsion having a viscosity of 12 cps (at 25° C., 12 rpm), pH value of 8, and a content of 40 percent (anionic).
[10] Polyfix 105 available from Showa Highpolymer Co., Ltd.: Aqueous solution of polyamide-epichlorohydrin copolymer having a viscosity of 30 to 75 cps (at 30° C., 10 rpm), pH value of 6 to 8, content of 15 percent (cationic).

Figure 1:
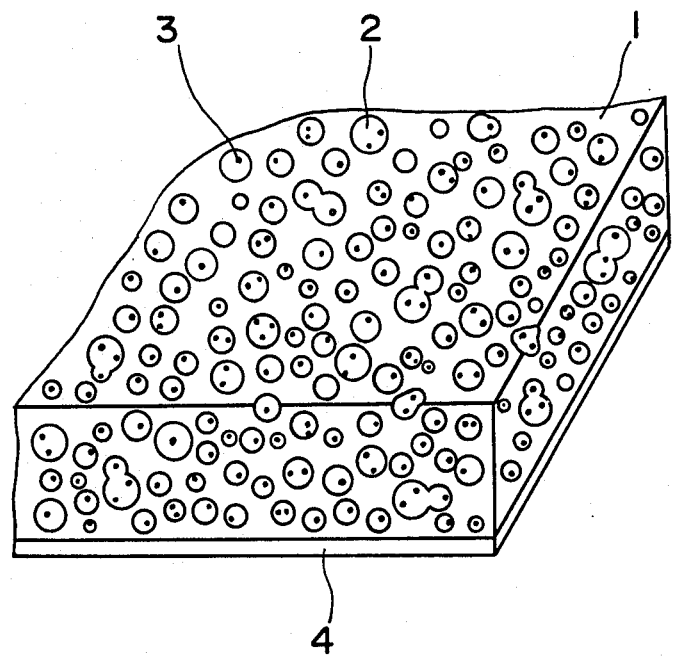
FIG. 1 is a schematic partial view of the foamed gypsum board of the present invention.
Figure 2:
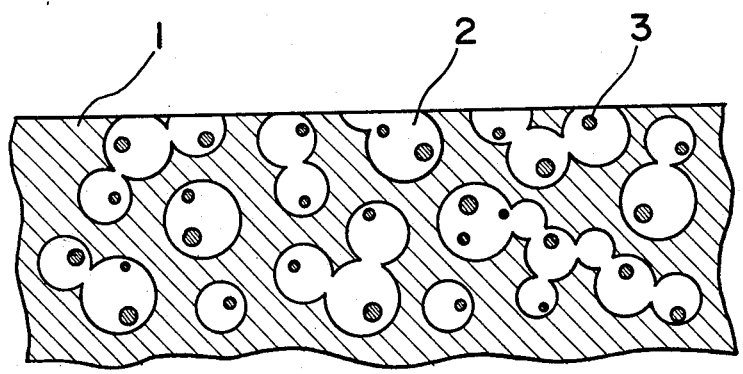
FIG. 2 is a partially enlarged sectional schematic view of the board of FIG. 1.

What is claimed is:

1. A foamed gypsum moulded article comprising a plurality of isolated cells, the cell walls of which have fine, intercell connecting passages.

2. The foamed gypsum moulded article according to claim 1, wherein an average diameter of the cell is from 0.15 to 4 mm.

3. The foamed gypsum moulded article according to claim 1, wherein an average diameter of the passages is from 0.5 to 1 mm, provided the diameter does not exceed half the diameter of the cell.

4. The foamed gypsum moulded article according to claim 1, wherein specific gravity of a foamed portion of the moulded article is from 0.4 to 0.7.

5. The foamed gypsum moulded article according to claim 1, wherein an expansion ratio of the moulded article is from 1.4 to 3.5

6. The foamed gypsum moulded article according to claim 1, wherein the intercell connecting passages are formed in the wall of at least 80 percent of the isolated cell.

7. The foamed gypsum moulded article according to claim 1, wherein the foamed gypsum moulded article is formed on face or back sheet material.

8. A process for producing a foamed gypsum moulded article which comprises foaming a gypsum slurry containing a foam stabilizer by decomposition of hydrogen peroxide using a cobalt compound which is produced by pretreating a water soluble cobalt salt with hydrogen peroxide in the presence of alkali.

9. The process for producing a foamed gypsum moulded article according to claim 1, wherein pH value of the gypsum slurry is at least 8.2.

10. The process for producing a foamed gypsum mouled article according to claim 1, wherein an amount of the water soluble cobalt salt is from 0.002 to 0.2 part by weight in the term of metal cobalt to 100 parts by weight of the gypsum.

11. The process for producing a foamed gypsum moulded article according to claim 1, wherein the water soluble cobalt salt is selected from a group consisting of cobalt sulfate, cobalt nitrate, cobalt chloride and cobalt acetate.

* * * * *

UNITED STATES PATENT AND TRADEMARK OFFICE
CERTIFICATE OF CORRECTION

PATENT NO. : 4,330,589
DATED : May 18, 1982
INVENTOR(S) : SAITO ET AL.

It is certified that error appears in the above–identified patent and that said Letters Patent are hereby corrected as shown below:

Column 3, line 45, "casted" should read --cast--; line 53, "pasages" should read --passages--. Column 4, line 12, "on" should read --depends on--; line 67, "casted" should read --cast--. Column 9, line 38, "0.5" should read --0.05--. Column 10, lines 35, 38 and 43, "claim 1" (each occurrence) should read --claim 8--.

Signed and Sealed this

Twelfth Day of October 1982

[SEAL]

Attest:

GERALD J. MOSSINGHOFF

Attesting Officer     Commissioner of Patents and Trademarks